A. H. VOECK.
MEANS FOR TREATING CREAM SEPARATOR DISKS.
APPLICATION FILED NOV. 22, 1910.
988,606.
Patented Apr. 4, 1911.
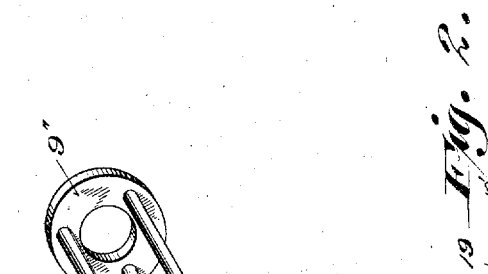

UNITED STATES PATENT OFFICE.

ARTHUR H. VOECK, OF NORTH FREEDOM, WISCONSIN.

MEANS FOR TREATING CREAM-SEPARATOR DISKS.

988,606.   Specification of Letters Patent.   Patented Apr. 4, 1911.

Application filed November 22, 1910. Serial No. 593,674.

*To all whom it may concern:*

Be it known that I, ARTHUR H. VOECK, a citizen of the United States, and resident of North Freedom, in the county of Sauk and State of Wisconsin, have invented certain new and useful Improvements in Means for Treating Cream-Separator Disks; and I do hereby declare that the following is a full, clear, and exact description thereof.

My invention consists in what is herein particularly set forth with reference to the accompanying drawings and pointed out in the claims of this specification, its object being to provide simple, economical means by which to facilitate easy, rapid and effective cleaning and sterilizing of the disks of a common type of cream separator.

Figure 1 of the drawings represents a vertical longitudinal sectional view approximately central of a disk-washing machine in accordance with my invention, one of the disks on a spindle of the machine being shown in side elevation; Fig. 2, a transverse section of the same on the plane indicated by line 2—2 in Fig. 1; Fig. 3, a partly sectional elevation of the tubular shaft, disks and the disk-holder of the aforesaid cream-separator, said disk-holder being positioned to have the disks slipped thereon from said tubular shaft; Figs. 4 and 5, horizontal section views respectively indicated by lines 4—4 and 5—5 in Fig. 3; Fig. 6, a perspective view of said disk-holder, and Fig. 7, a partly sectional view of a detail of the machine.

Referring by numerals to the drawings, 7 indicates the tubular shaft above noted, and 8 the separator-disks that ordinarily engage said shaft and wings 7' of the same. The wires 9 of the above noted disk-holder are registrable with said wings to be engaged by said disks when the same are displaced for cleaning, the relative arrangement of the aforesaid disks being thus preserved.

My invention comprises a spindle 10 designed to be slipped through the central aperture of the sleeve 9' and head 9" of the disk-holder, and a lateral lug 10' of the spindle is designed to oppose a wire of said disk-holder.

Supported in connection with a base 11 of suitable material is a tank 12 having a preferably semi-circular bottom 12', and a cover 13 is provided for the tank. Secured within the tank adjacent to one end of the same is a transverse bar 14 provided with a central depression 14' that serves as a bearing for one end of the spindle 10, the other end of this spindle being hollow and provided with a ⊢-shaped or other suitable angle slot for detachable engagement of a lateral lug 15' of a preferably shouldered shaft 15 for which the adjacent end of said tank is provided with a bearing. A suitable length of tubing may be provided with a lateral lug and angle slot to serve as the spindle aforesaid. The shaft 15 has support in a bearing portion 16 of a stand secured upon the base 11, and a spur-pinion 17 fast on said shaft is in mesh with a spur-wheel 18 that is fast on an arbor 19 for which the stand is also provided with a bearing 20, the arbor being held to rotation in its bearing by any suitable means. The stand aforesaid is preferably a single casting made fast on the base 11, and the driving spur-wheel 18 is provided with a turning handle 18', the mounting of said wheel to permit of its rotation being that herein specified or in any other convenient manner with reference to said stand.

In practice, the disks 8 are slipped off the tubular shaft 7 of the separator onto the disk-holder in the usual manner, the spindle 10 positioned in engagement with the sleeve 9' of said disk-holder to have its lug 10' come between wires 9 of the same disk-carrying device, after which said spindle is coupled to the shaft 15, within the tank 12, and engaged with the bearing 14'. The tank being supplied with water, at a suitable temperature, and covered, rotary motion is imparted to the spindle, disk-holder and disks thereon by means of the gearing above specified, the result being a thorough cleaning of said disks. After cleaning the disks may be rinsed and thereafter sterilized in said tank.

I claim:

1. A machine for treating cream-separator disks, the same comprising a tank provided with an inner bearing, a driven-shaft extending into the tank, and a spindle having detachable connection with the shaft and mounted in said bearing, said spindle being provided with means for compelling rotary motion of a disk-carrying device with which it is engageable.

2. A machine for treating cream-separator disks, the same comprising a tank provided with an inner bearing, a driven-shaft extending into the tank, a spindle having detachable connection with the shaft and mounted in said bearing, and a lug extending from the spindle to extend between wires of a disk-carrying device with which the spindle is engageable.

3. A machine for treating cream-separator disks, the same comprising a base, a tank and stand on the base, a bearing provided in the tank, a shaft for which the tank and stand are provided with bearings, an arbor for which the stand is provided with a bearing, gearing connecting the arbor and the shaft, and a spindle having detachable connection with said shaft and mounted in the bearing first aforesaid, said spindle being provided with means for compelling rotary motion of a disk-carrying device with which it is engageable.

In testimony that I claim the foregoing I have hereunto set my hand at North Freedom in the county of Sauk and State of Wisconsin in the presence of two witnesses.

ARTHUR H. VOECK.

Witnesses:
 FRANK ENGEL,
 B. RAGATZ.